United States Patent [19]

Jurcak

[11] 3,735,445
[45] May 29, 1973

[54] LOBSTER TAIL CUTTING DEVICE

[76] Inventor: Frank C. Jurcak, c/o Sirloin House, Route 18 & 51, Lostart, Ill. 61334

[22] Filed: July 22, 1971

[21] Appl. No.: 165,119

[52] U.S. Cl............................................17/71, 83/607
[51] Int. Cl.........................A22c 29/00, B26d 04/34
[58] Field of Search.............................17/71, 52, 53; 146/146 R, 146 A, 141; 83/607

[56] References Cited

UNITED STATES PATENTS

| | | | |
|---|---|---|---|
| 3,356,118 | 12/1967 | Priset | 146/141 X |
| 1,013,361 | 1/1912 | Barry | 146/146 R |
| 81,427 | 8/1868 | Soles | 146/146 R |
| 103,601 | 5/1870 | Goodsell et al. | 146/146 R |
| 1,007,593 | 10/1911 | Moore | 146/146 R |
| 2,335,806 | 11/1943 | Sjostrom | 17/71 |

*Primary Examiner*—Robert W. Michell
*Assistant Examiner*—John F. Pitrelli
*Attorney*—Clarence A. O'Brien and Harvey B. Jacobson

[57] ABSTRACT

For cutting frozen or fresh lobster tails, a time and labor saving tail-holding and cutting device for safe use by restaurant cooks when preparing lobster tails. A non-corrodible plate provides a foundation for the ready-to-sever lobster tail. This plate is provided at the site of operation with positioning and guide means for temporarily stabilizing and maintaining the tail in a localized captive state. A manually actuatable blade is operatively cooperable with the surface and has a cutting edge movable toward and from the plate surface in a manner to longitudinally cleave the tail. An adjustable adapter bracket is provided for pivotally anchoring the forward or distal end of the cutting blade. The proximal end is provided with an appropriate handgrip and limit stop which prevents the cutting edge from coming into direct contact with the surface of the foundation plate. An upstanding portion of the bracket and coordinating guide means facilitates maintaining the lobster tail in a given position for safe and reliable cutting needs.

7 Claims, 4 Drawing Figures

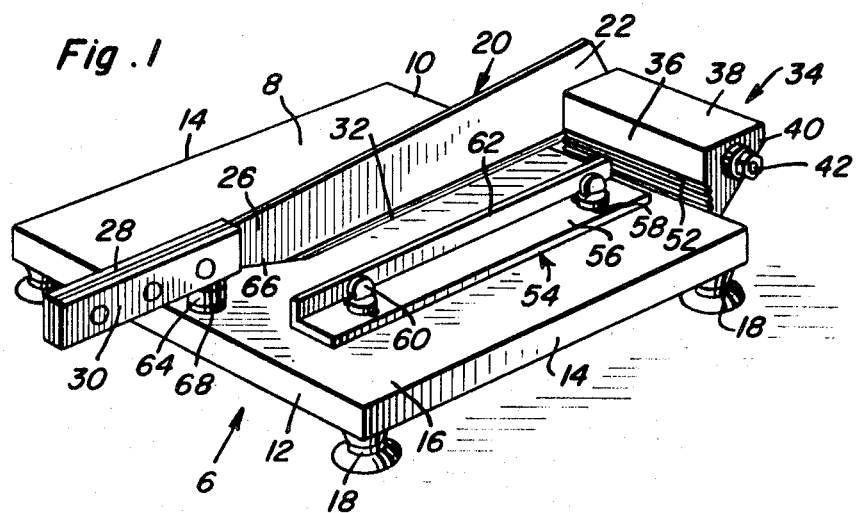

LOBSTER TAIL CUTTING DEVICE

The present invention relates to certain new and useful improvements in a lobster tail holding and supporting device, that is, an adaptation wherein the placement and support surface for the severable lobster tail is equipped with simple but practical facilities which promote safe and expedient use of an easy-to-operate blade.

There has long existed a need for a simple, practical and reliable lobster tail cutting device for use by chefs or anyone involved in the commercial preparation of lobster tails. It is an object of the present invention to dispense with the drudgery of preparing a lobster and provide an expeditiously usable but safe holder and cutter which can be approved by manufacturers and retailers and which can be unqualifiedly endorsed for safe use in seafood restaurants specializing in the sale, for example, of lobster tails.

More specifically the herein disclosed concept has to do with a holder and cutter which lends itself to satisfactory and effectual use when one is called upon to cut lobster tails and in order that they may be prepared out of the shell. For the most part and at the present time it is common practice to prepare a lobster in one of two ways. As a general rule lobsters are delivered for use in a frozen state. It follows that cooks must either attempt to cut the frozen lobster by hand or, alternatively, to prepare it inside the shell. Cutting a frozen lobster is and can be quite dangerous because the cook must rest one hand on the frozen lobster tail as he attempts to properly cut through the frozen lobster. However, and it often happens that the lobster slips from side to side and an even or uniform cut is rarely obtainable. An alternative procedure is to prepare the lobster in the shell. Not only does this cause the lobster to lose some of its flavor, it is also very difficult to extract from the shell after it is prepared. The device disclosed herein is such in construction and capability that it will lend itself to acceptable use by the entire restaurant industry.

Admittedly, it is old in the art to provide a device which lends itself to cutting of a shell fish and which is characterized by a base plate having a knife pivotally mounted centrally thereon and for completely cutting through the shell or body of the shell fish. Other patents have to do with cutters employing pivotally mounted blade members usable in one manner or other with a base plate.

Briefly the holder and cutter herein disclosed pertains to a stand held in place by suction cups or the like and embodying a rigid non-corrodible base plate whose working surface is planar and is of an area to facilitate placing and cleaving lobster tails of different sizes. An adapter bracket is adjustably and detachably mounted on a marginal edge portion of the base plate. Limit stop means is also mounted on the base plate and is located for cooperation with and is properly lined up with the bracket. A manually actuated and controllable blade has a forward or distal end which is pivotally mounted on the adapter bracket. The proximal or inward end of the blade projects beyond the inward marginal edge of the plate and is equipped with an overhanging rubber or equivalent conveniently grippable handgrip. More particularly the handgrip overlies and is adapted to engage an underlying resilient limit stop bumper. The blade has a cutting edge which is prevented by the bumper and the coacting pivot point from coming into destructive contact with the support surface or undesirably cutting through the ventral side shell of the lobster tail.

More specifically, novelty is predicated on an adapter bracket which has a ribbed portion cooperating with stationary ribs on a marginal edge of the base plate and which is adjustably bolted in place. An upstanding portion of the bracket provides an abutment surface which assists in locating and maintaining the coacting end of the lobster tail within the confines of the cutting site. Guide means is mounted atop the surface and is located for coaction with the bracket and limit stop means.

It will be noted in connection with the disclosed adaptation that the cutting edge on the cutter blade does not come into colliding contact with the surface of the base plate and accordingly does not cut through the shall of the lobster. In addition the adapter bracket is horizontally elongated and vertically adjustable to regulate the height of the pivot point, and the forward end of the blade is pivotally and detachably mounted on the bracket. The limit stop bumper can be vertically adjustable. In addition the guide atop the plate between the bracket and the bumper and to one side thereof provides the desired buttressing facility and expedites placement and holding of the lobster tail in an advantageous position and manner for safe cleaving.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective of a lobster tail cutting device constructed in accordance with the principles of the invention and showing the stand-type base, the adapter bracket, cutting blade, limit stop and guide means all in ready-to-use association.

FIG. 2 is an enlarged central view taken through the structure depicted in FIG. 1 and which shows the lowermost position of the cutting edge, the down position of the blade and the functioning of the bumper and adapter bracket.

FIG. 3 is a view on a smaller scale observing the structure of FIG. 1 in a direction from right to left.

And FIG. 4 is a fragmentary top plan view showing the lobster tail in phantom lines and showing the general relationship of the component parts.

With reference first to FIG. 1 wherein the coacting component parts of the overall device are shown, it will be observed that the aforementioned stand is denoted by the numeral 6. This stand, alternatively, is referred to as a base plate, that is a plate which has a flat or planar top support surface 8 and which is preferably but not necessarily rectangular in plan. The forward or distal marginal edge is denoted at 10, the rearward or proximal marginal edge at 12 and the joining side left and right edges are denoted at 14. The respective corner portions 16 are supported by feet, preferably rubber suction cups 18.

The aforementioned cutting blade is denoted by the numeral 20 and has a relatively wide distal or forward end portion 22, a median body portion 24 and a narrowing proximal end portion 26 terminating in a shank 28 provided on opposite sides with rubber or equivalent compressibly resilient members 30. These members are riveted or otherwise secured to the shank and conjointly provide an appropriate handgrip which projects beyond and overhangs the inward or proximal marginal edge 12. This blade is sturdy and the lower edge portion is provided with a longitudinal appropriately ground cutting edge 32.

The forward or distal end portion of the blade is pivotally and detachably mounted. This result is preferably achieved through the use of a mounting which is here referred to as an adapter bracket 34. This bracket is angular in cross section and embodies a depending vertical flange 36 and a horizontal top flange 38. The end portions of these flanges are joined by substantially triangulate webs 40 which are provided with bolt holes for an insertable and removable bolt 42. The headed end portion 44 (FIG. 3) of this bolt is provided with a washer and serves to anchor and pivotally support the coacting end portion 22 of the blade. The upstanding portion of the vertical flange 36 provides an abutment. The lower portion of the flange is provided with slots 46 which serve to accommodate headed connecting and adjusting bolts 48. Thus the overall bracket 34 is capable of being vertically adjusted to raise and lower the pivot point in a manner to elevate the cutting edge 32 of the blade. For best results an edge portion of the marginal edge 10 is provided with anti-slipping teeth or ribs 50 which coact with similar ribs 52 whereby to securely maintain the adapter bracket in that position to which it is adjusted for best use. The bolts and slots provide for raising and lowering of the cleaving or cutting blade to facilitate cutting lobster tails of different sizes. In practice the blade 20 is usually 14 inches long with a 5 inch handle. The height of the blade is between 2¼ inch and 3¼ inch. The stainless steel or equivalent base plate is usually 12 × 12 inches. That surface of the flange 36 which is shown above the level of the support surface of the plate provides an abutment which facilitates locating the lobster tail in the desired site of operation. This abutment surface coacts with a complemental lobster tail positioning and stabilizing guide which could also be referred to as a bracket or fixture but which is referred to specifically as an angle iron 54. The horizontal flange 56 is seated flatwise but adjustably and detachably atop the plate. It is provided with slots 58 to accommodate screw-threaded headed fasteners 60 thus permitting the vertical flange 62 to be adjusted toward and from the locale of the cleaving or cutting blade 20. This angle iron is of requisite length and extends across the top surface of the plate and is slightly spaced from and is at right angles to the abutment 36. Thus this abutment 36 plus the function of the guide and buttressing flange 62 facilitates positioning and maintaining the lobster in the cutting position suggested in phantom lines in FIG. 4, in which position it is centralized with respect to the liftable and lowerable cutting blade.

The numeral 63 designates limit stop means, more specifically a rubber or an equivalent bumper 64 which is screwed or otherwise adjustably secured in place (not detailed). This bumper is located beneath the handle portion of the knife and interposed between the handle and the surface 8 and prevents the cutting edge from being lowered into damaging or colliding contact with the non-yielding surface 8. That portion of the blade adjacent to the bumper 64 is cut at an oblique angle as shown at 66. It will also be noted that at least one adjusting washer 68 is shown but in practice a number of washers which function somewhat as shims can be employed to raise and lower the bumper so that it will be at a proper level relative to the height of the pivot point of the cutting blade 20. In other words, when the adapter bracket is adjusted up or down the bumper means can also be adjusted to achieve the desired and coordinating result. Then too the fact that the angle iron 54 is adjustable and also removable adds to the overall advantages of the device. It will be noted in this connection that the cutting edge does not cut into the shell of the lobster and at no time does it reach the support surface of the base plate. Then too it is to be noted that the three adjustable features, the adjustable adapter bracket 34, the adjustable guide 54 and the adjustable limit stop 64 provide significant and important features of the tail cutting device. In fact, experience has shown that this device can be used safely and more quickly than ordinary hand cutting adaptation. Then, too, frozen lobster tails can be spotted and cut and split in a matter of minutes. Ordinarily and under prevailing procedures the cook would have to wait many hours until the frozen lobsters are thawed. Then considerable time would be required to cut the thawed lobsters. Experience has shown that the herein disclosed device is virtually effortless to operate. But little downward pressure is needed to cut through the frozen lobsters. Further, knife injuries are reduced to a minimum because the fingers are not placed anywhere near the cutting blade. It follows that a device constructed as herein shown and described well serves the purposes for which it has been devised and successfully used.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A lobster tail holder and cutter comprising a rigid base plate having a support surface, an adapter bracket mounted on said base plate, limit stop means also mounted on said base plate and located for aligned cooperation with said bracket, a manually actuated and controllable cleaving blade having a distal end pivotally mounted on said adapter bracket and a proximal end provided with a handgrip, said handgrip overlying, extending beyond and being adapted to engage said limit stop means, said blade having a cutting edge which is prevented by the pivot point and limit stop means from coming into destructive contact with said support surface, said adapter bracket being adjustably mounted on a forward distal marginal edge of said base plate and having an upstanding abutment surface which assists in locating and maintaining a coacting end of the lobster tail within the confines of the cutting site, and, in combination, lobster tail positioning and guide means located between said adapter bracket and limit stop means and having one end terminating adjacent to said bracket.

2. The lobster tail holder and cutter defined in and according to claim 1, and wherein said bracket is angular in cross-section, is provided at its respective ends with webs, said webs having a bolt passing through bolt holes provided therefor in said webs and one end of said bolt serving to support and pivotally mount the adjacent distal end of said blade.

3. The lobster tail holder and cutter defined in and according to claim 2, and wherein said positioning and guide means is characterized by an elongated angle iron having a horizontal flange adjustably mounted on said surface and an upstanding vertical flange, said latter flange providing a buttressing and stabilizing guide.

4. The lobster tail holder and cutter defined in and according to claim 1, and wherein said limit stop means comprises an upstanding compressibly resilient bumper adjustably and replaceably mounted atop said base plate, said bumper constituting a lobster tail locating abutment and assisting in positioning and retaining a coacting end of the lobster tail in a ready-to-cleave position.

5. The lobster tail holder and cutter defined in claim 1, and wherein the distal pivoted end of said blade is accessibly and detachably mounted on one end of said adapter bracket and is adjustably raisable and lowerable relative to said support surface in conjunction with said bracket.

6. The lobster tail holder and cutter defined in and according to claim 1, and wherein said forward distal marginal edge is provided with longitudinal anti-slipping ribs, and wherein a coacting surface of said adapter bracket is also provided with longitudinal anti-slipping ribs oriented and clampingly engaging said first named anti-slipping ribs.

7. A portable lobster tail holder and cutter comprising a rigid non-corrodible base plate having a horizontal planar lobster tail supporting surface, a forward distal marginal edge and a rearward proximal marginal edge, a horizontally elongated adapter bracket adjustably and removably mounted on a predetermined portion of said distal marginal edge, said bracket having an upstanding vertical surface disposed at right angles to and rising above the plane of said supporting surface, a vertically adjustable compressibly resilient bumper mounted atop said support surface, said bumper constituting a yieldable limit stop, being spaced from but aligned with one end of said adapter bracket and being located adjacent a predetermined portion of said proximal marginal edge, a single elongated upstanding rigid guide spanning the space between said adapter bracket and limit stop, said guide being detachably and adjustably mounted atop said support surface and having a forward distal end terminating adjacent a median portion of said vertical surface and a proximal end terminating short of and laterally spaced and offset from the locale of said limit stop, and a manually actuatable and controllable cutting blade having a forward distal end detachably and pivotally mounted on said one end of said bracket and a rearward proximal end provided with a handgrip overlying and extending beyond and cooperatively adapted to engage said limit stop, said blade having a cutting edge which is prevented by the conjoint action of the pivotal point and limit stop from being forced into destructive contact with said supporting surface.

* * * * *